J. F. SEIBERLING.
HARVESTER-RAKE.
No. 173,102. Patented Feb. 1, 1876.
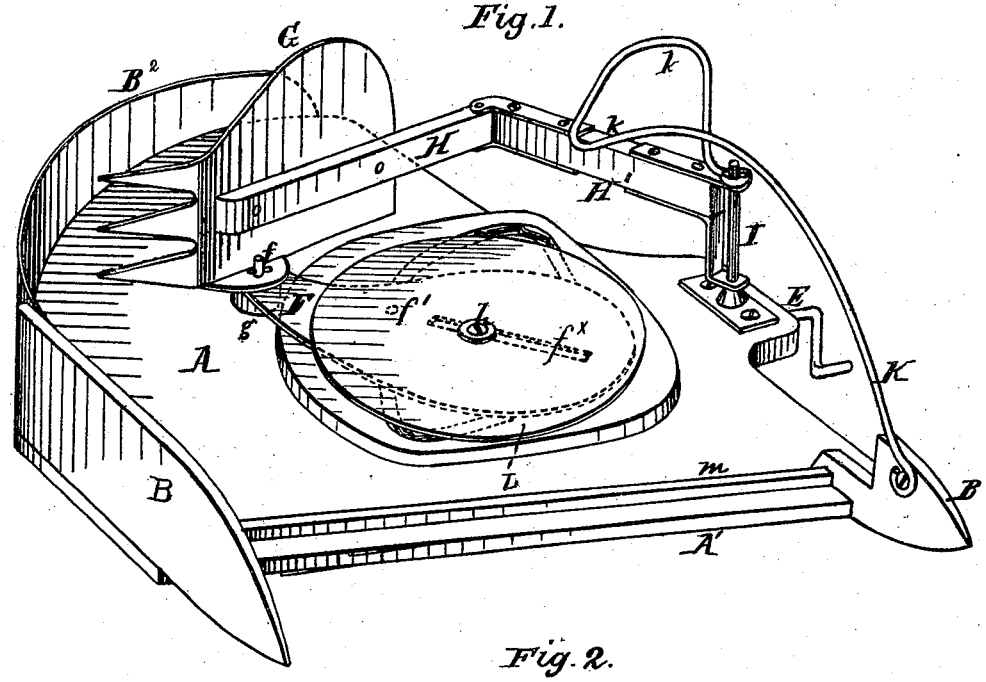
Fig. 1.
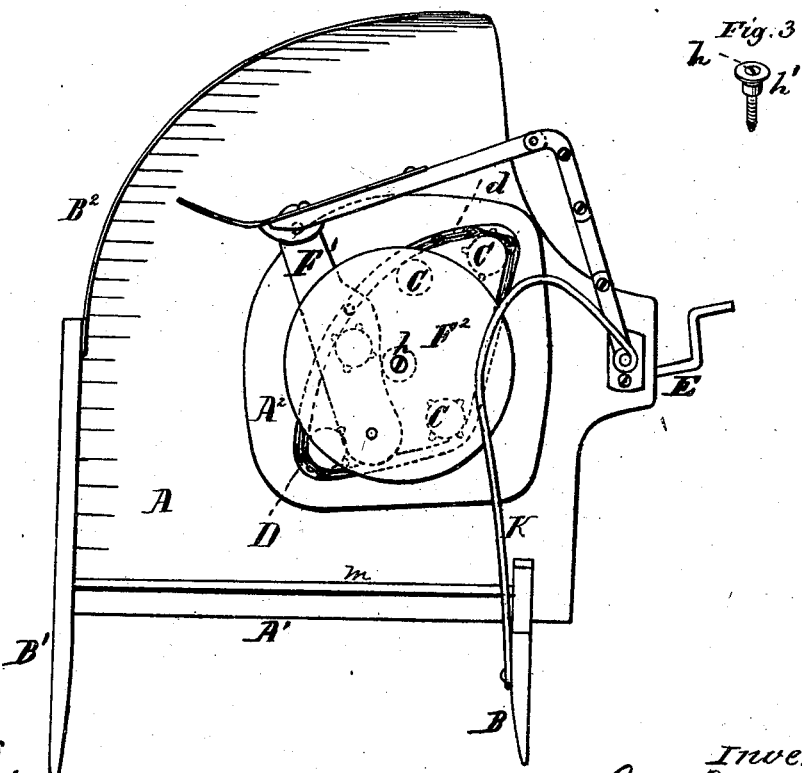
Fig. 2.
Fig. 3.
Witnesses
Alex Mahon
John G. Center
Inventor
John F. Seiberling
by A. M. Smith
Attorney

UNITED STATES PATENT OFFICE.

JOHN F. SEIBERLING, OF AKRON, OHIO.

IMPROVEMENT IN HARVESTER-RAKES.

Specification forming part of Letters Patent No. 173,102, dated February 1, 1876; application filed December 2, 1875.

*To all whom it may concern:*

Be it known that I, JOHN F. SEIBERLING, of Akron, county of Summit, State of Ohio, have invented certain new and useful Improvements in Harvester-Rakes, of which the following is a full, clear, and exact description, reference being had to the accompanying drawings, making part of this specification, in which—

Figure 1 represents a perspective view of a harvester-platform with my improvements applied; and Fig. 2 is a plan view of the same, showing a modification in the form of the chain-arm.

Similar letters of reference denote corresponding parts in both figures.

The invention relates to that class of rakes in which the rake-head, connected with a jointed stale, is moved through an endless path, conforming to the outlines of the platform, by means of an endless chain moving through a path conforming to that of the rake; and consists in combining the rake-head with the driving-chain through the medium of a sliding or extensible driving-arm, pivoted both to the rake-arm and to the driving-chain, and jointed to, or connected with, a fixed center, around which said arm revolves, for imparting the endless movement to the rake, as hereinafter explained. It further consists in the combination, with the chain and extensible chain arm or lever, which drive the rake, of a cover or shield, centrally supported, in such manner that it can either revolve or remain stationary, governed by the friction thereon of the grain, rake-arm, or platform, as hereinafter explained. It further consists in a novel arrangement of guard-rod or fender, one end of which is supported upon the inner shoe or divider, and the other end upon the stand or pivot which supports the rake-stale, said rod or fender being bent into form to permit the passage of the rake underneath it, and serving to protect the rake in its forward or return movement from the falling grain, as hereinafter described. It further consists in certain details of construction and arrangement, hereinafter fully explained.

In the accompanying drawings, A represents a grain-platform, of the circular or quadrantal form, designed to be connected at its forward edge $A^1$ with the usual cutting apparatus, and provided at its ends with dividers or dividing-boards B $B^1$, and upon its outer curved side with a grain-guard, $B^2$, all these parts being of the usual or any preferred construction. Adjacent to the inner sides of the platform, and arranged in the form of a triangle, are a series of horizontal pulleys or sprocket-wheels, C C, mounted upon suitable vertical pivots or shafts supported by the platform, said pulleys or wheels being either let into sockets in the platform, or raised above the same, as may be preferred. An endless grooved way, D, approximating in form the outlines of the platform, extends around the pulleys or sprocket-wheels, and forms a path for the endless driving-chain $d$, to which motion is imparted by one of the sprocket-wheels, the shaft of which is provided on its lower end with a bevel-wheel, which engages with a bevel-wheel on the shaft E, which is driven from any convenient driving-shaft of the machine. Where the sprocket-wheels and driving-chain are raised above the surface of the platform, the sockets for the wheels and the groove for the chain are formed in a smaller raised plate or quadrant, $A^2$, conforming in outline to the shape of the platform, but leaving a path outside of and around it, as shown by the drawings, for the passage of the rake-head and grain. At or near the center of the area surrounded by the driving-chain $d$ is pivoted a slotted arm, F, consisting of a broad thin metal plate, its inner slotted end being expanded in width, and curved, so as to leave no projecting corners or angles for catching the grain. By this construction of the arm it is made sufficiently strong or rigid for the work required of it, while at the same time it is adapted to move readily under the straw or grain on the platform without catching or disturbing the same. The outer end of this arm is pivoted at $f$ to the rake-head, and at a point intermediate between the rake-head and the central pivot $h$, a pin at $f'$ connects the arm F with the driving-chain $d$, by means of which a rotary movement is imparted to the arm F, the slot therein at $f^x$ permitting endwise movement of the arm on the central pin or pivot $h$, to provide for the varying distance of the pin $f'$ from the pivotal center of the arm. The central pivot $h$ has a small grooved roller, $h'$, (see Fig. 3,) mounted upon it for facilitating this movement of the slotted chain arm or lever.

The rake-head and palm G, which may be of the usual or any preferred construction, are connected with a jointed stale, H H$'$, the inner arm or part H$'$ of which is pivoted upon a standard or vertical pivot, I, secured to the inner side of the platform, as shown.

By this arrangement of the jointed stale the rake-head, while it is moved through the irregular endless path described by the pin $f$ on the arm F, is prevented from rotating, and is maintained in the proper relation to the platform and the guard or fender B$^2$ for most efficiently acting on the grain.

To the inner dividing-board or shoe B is secured the forward end of a bent rod or fender, K, which, rising to the rear, forms an extension of said dividing-board. This rod is bent in an irregular form, (shown by the drawing,) and overhangs the path of the rake-head in its forward or return movement, being arched in two places, $k$ and $k'$, to permit the passage of said rake-head underneath it, and has its rear end secured to the rake-stale pivot or standard I, the rod, by this arrangement, being made to serve the double purpose of protecting the rake on its forward or return movement from the falling grain, and of deflecting said grain outward within the reach of the rake in its operative stroke.

Instead of making the chain arm or lever F in one piece and slotting it, as described, to provide for its endwise movement, it may be made in two pieces, as shown in Fig. 2, in which F$^1$ represents the chain-arm connected with the rake-head and driving-chain, and jointed at its inner end to an inner arm or disk, F$^2$, which in turn is pivoted centrally at $h$, the flexing of the joint between the parts F$^1$ F$^2$ accommodating the varying distance of the pin $f'$ from the pivotal center in lieu of the slot in the single arm F.

Over the chain-arm F or F$^1$ F$^2$ and the driving-chain $d$ is placed a shield or cover, L, secured in place by means of the central pin or bolt $h$, and allowed to rest upon, and to turn with, the arm F, or to remain stationary, as the relative friction of the arm, or of the grain or platform thereon, may determine. Ordinarily, as the rake sweeps the grain across the front of the platform, the friction of the grain and of the arm F on the shield will cause it to move therewith; but as the gavel in being removed is carried clear of the shield the pressure of the falling grain accumulating thereon will serve to hold the shield stationary.

In grain of the usual length the shield L may be dispensed with, the form of the driving or chain arm being such that the grain will not catch thereon; but in clover-seed, or where the straw is short and wet, the shield or cover will be found advantageous in protecting the driving chain and arm from being choked or clogged thereby.

Near the forward edge of the platform is a raised strip or ledge, $m$, which serves to hold the butts of the grain above the surface of the platform, thereby facilitating the grasp or action of the rake thereon.

Where the rake is raised above the surface of the platform by means of the supplemental quadrant A$^2$, as explained, the rake is provided on its lower side with a (one or more) downwardly-projecting tooth or spur, as at $g$, for removing the short straw resting on the surface of the platform, said spur, in the present instance, being provided with, or made in the form of, a friction-roller, for facilitating its movement around the corners or angles of the raised way A$^2$.

Having now described my invention, what I claim as new, and desire to secure by Letters Patent, is—

1. The combination, with the platform, of the endless chain moving in an irregular path near the inner end on the platform, the chain-lever pivoted to the chain, the outer end of which carries a rake, and the other end of which is supported by a bearing located centrally of the chain-track, and around which the lever is revolved by the chain, substantially as described.

2. The combination, with the endless chain traveling the irregular track on the platform, of a chain-lever that will permit a variation of its length between the central bearing and the chain-pivot, for the purpose set forth.

3. An arm or lever, for carrying a rake around a center on the platform, made of thin sheet-metal, and the inner end made in a circular form to prevent the grain from catching thereon, to obviate the necessity of a shield to protect the same, substantially as described.

4. The shield sagging loosely on the platform and arm that carries the rake, and centrally pivoted, so that it can either revolve or remain stationary, as described.

5. The combination, with the platform, of the chain, traveling an irregular path on the platform, the chain-lever, operating as described, and the jointed rake-stale, when operating together, as set forth.

6. The spur or projection on the under side of the end of the arm that carries the rake, to sweep the space between the arm and the platform, as described.

7. The rake-guard or fender-rod K, one end of which is supported on the inner divider-board, and the other end by the stand that supports the rake-stale, as shown and described.

In testimony whereof I have hereunto set my hand this 30th day of November, A. D. 1875.

JOHN F. SEIBERLING.

Witnesses:
 LOUIS FISCHER,
 THOMAS W. GOODIN.